April 12, 1938.   W. J. POLYDOROFF   2,113,603
HIGH FREQUENCY INDUCTANCE DEVICE
Original Filed May 7, 1931    4 Sheets—Sheet 1
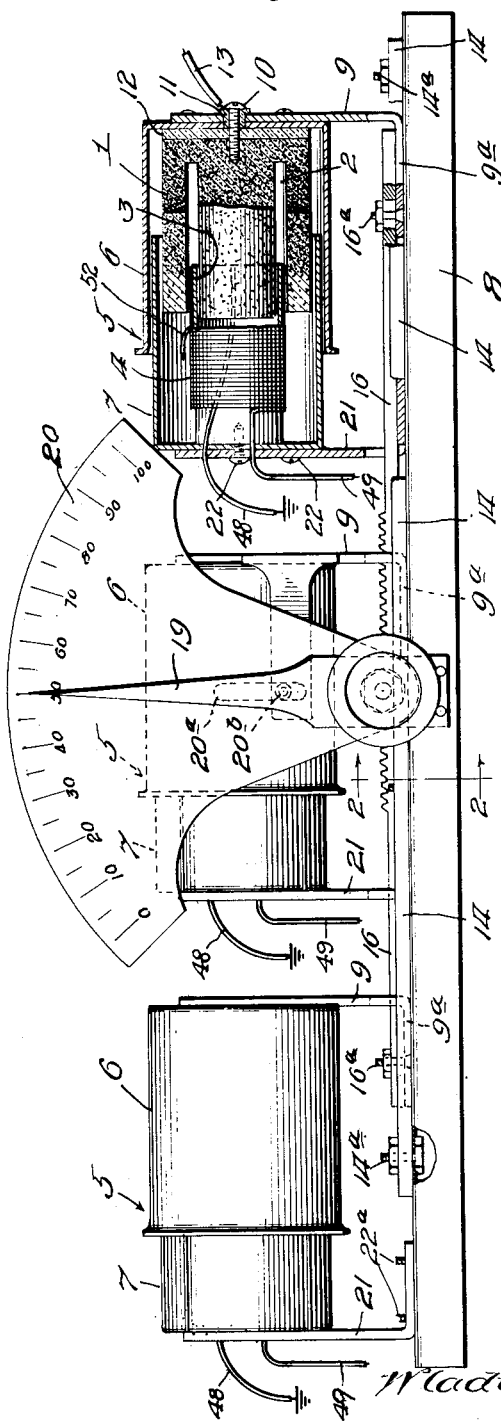
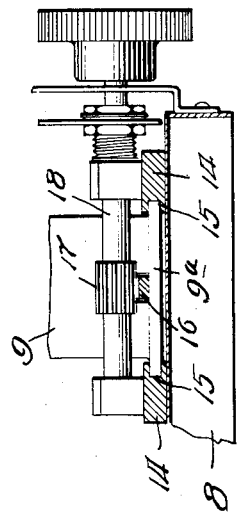
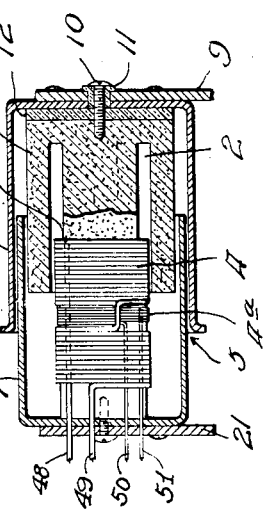

April 12, 1938. W. J. POLYDOROFF 2,113,603
HIGH FREQUENCY INDUCTANCE DEVICE
Original Filed May 7, 1931 4 Sheets-Sheet 2
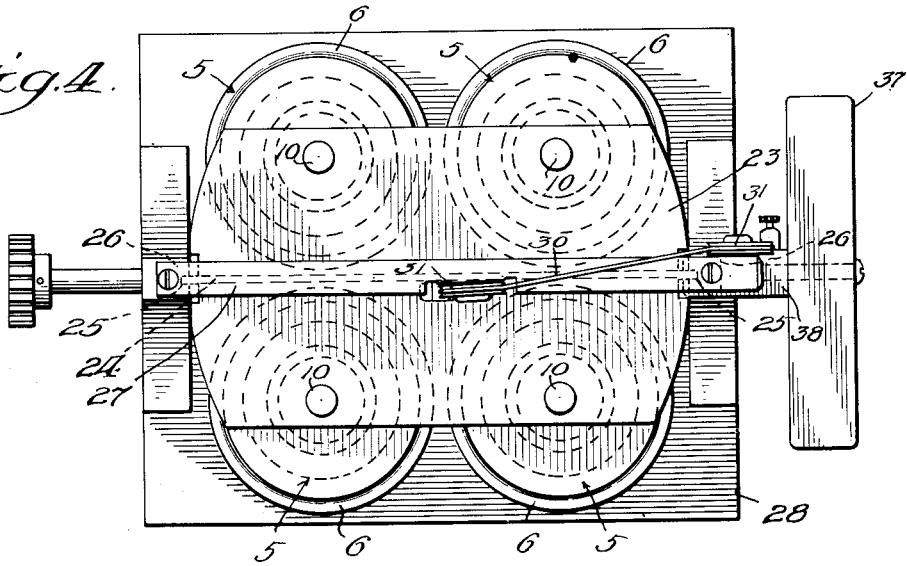
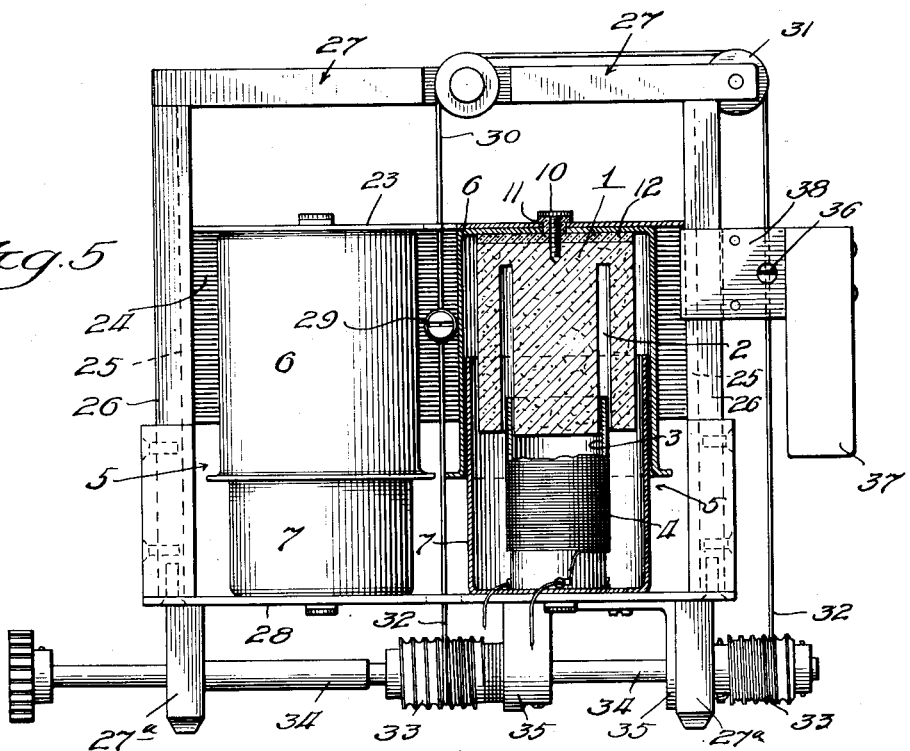

April 12, 1938.  W. J. POLYDOROFF  2,113,603

HIGH FREQUENCY INDUCTANCE DEVICE

Original Filed May 7, 1931   4 Sheets—Sheet 3

Wladimir J. Polydoroff.
Inventor:

by Thomas G. Stewart
Atty

April 12, 1938.  W. J. POLYDOROFF  2,113,603

HIGH FREQUENCY INDUCTANCE DEVICE

Original Filed May 7, 1931  4 Sheets-Sheet 4

Wladimir J. Polydoroff. Inventor.
By Thomas G. Stewart, Atty.

Patented Apr. 12, 1938

2,113,603

UNITED STATES PATENT OFFICE 2,113,603

HIGH-FREQUENCY INDUCTANCE DEVICE

Wladimir J. Polydoroff, Chicago, Ill., assignor to Johnson Laboratories, Inc., Chicago, Ill., a corporation of Illinois Application May 7, 1931, Serial No. 535,606
Renewed April 26, 1937

18 Claims. (Cl. 171—242)

The invention relates to variable inductance devices, which, among their other advantageous uses, may be employed as parts of radio-frequency circuits. The improved variable inductance devices herein disclosed include inductance coils and magnetic cores adjustable relatively thereto, the combination being such that at all high frequencies, maximum permeability of the core consistent with the desired losses involved in any case, may be attained.

One object of the invention is to provide a new and useful tuning device suitable for use in high-frequency circuits of the variable inductance rather than the variable capacitance type, and which will therefore avoid the usual disadvantages encountered with the latter type. Among the disadvantages of systems employing variable condenser tuning, which it is one of the objects of the present invention to overcome, is the non-uniformity of the performance of the circuits throughout the tuning range. The present invention provides a tuning device which when employed at radio frequencies, permits tuning a circuit over a desired range of frequencies, while at the same time maintaining the performance of the circuit substantially constant from the standpoint of gain or amplification, as well as selectivity.

Additional objects and advantages of the present invention will be apparent from what is to follow. Among these may be mentioned the provision of tuning devices which are not subject to detuning or other difficulties due to mechanical vibrations, and which are inherently incapable of the microphonic action by which sustained audio-frequency oscillations frequently arise in condenser-tuned systems. Also to be noted are the advantages of extreme compactness, ease of assembly, and the ease and effectiveness of shielding to avoid the effects of extraneous electromagnetic and/or electrostatic fields.

Still another object of the invention is to provide a tuning device which may be readily ganged in groups, in those cases where a plurality of tuned circuits is desired, with easy and substantially perfect synchronization by simple mechanical means.

The core embodied in the present device may be one of the compressed powdered-iron type which is fully described in my United States Patent No. 1,982,689 issued December 4, 1934, and which may have varying magnetic density along its magnetic path as disclosed therein.

The invention will be best understood if reference be made to the accompanying drawings in which—

Figure 1 is a view in elevation of one embodiment of the invention, in which inductance coils are included, parts being broken away to show interior elements of the device;

Figure 2 is a fragmentary sectional view of parts of the device taken in the line 2—2 of Figure 1;

Figure 3 is a sectional view showing the windings of a transformer which may be used as a substitute for the inductance coil structure shown in Figure 1;

Figure 4 is a plan view of a modified embodiment of the invention;

Figure 5 is a side view, partly in section, of the modification shown in Figure 4;

Figure 26:
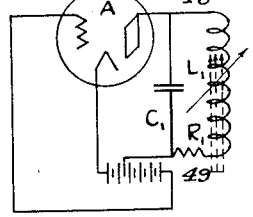
Figure 27:
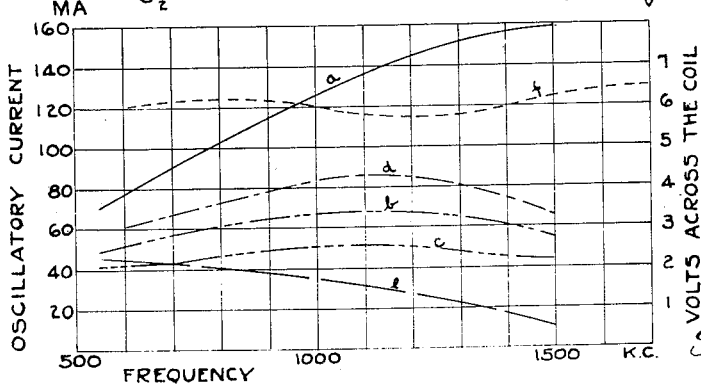

Figures 6 to 26, inclusive, are views showing, in high-frequency circuits, various adaptations of the invention; and Figure 27 is a graph indicating results attained by the use of the invention.

Specifically, the present invention involves a radio-frequency inductance device having a core, such as is described in my aforesaid patent, and so arranged in any one of various radio-frequency circuits, that tuning of that circuit may be effected by adjustments of the core with the attainment of the several advantages hereinafter indicated.

Referring to Figures 1-5 inclusive of the drawings, I is a compressed magnetic core preferably having an annular cavity 2 that is adapted to receive a tube 3 carrying either an inductance coil 4 (Figures 1 and 5) or the windings of a transformer 4 and 4a (Figure 3).

As shown, the core I is movable, while the tube 3 carrying either the coil 4 or the coils 4 and 4a, is fixed, to thereby effectuate variations of inductance in the instrument 5, which, as herein revealed, may be employed for tuning radio-frequency circuits of different types.

Telescoping open-ended shields 6, 7 of any suitable material may be employed in order at all times to exclude external inductive influences, and also to negative the mutual inductance between adjacent instruments 5.

Figure 13:
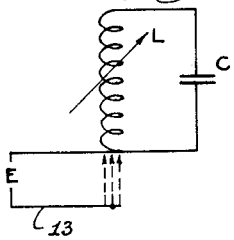

In Figure 1, triple instruments 5 are shown, all of which are mounted on a base 8, standards 9 being attached to and constituting supports for the shields 6 and the cores I therein. Screws 10, insulated by sleeves 11, extend through holes in the upper ends of the standards 9, through holes in the closed ends of the shields 6, and into the cores I, to thereby unite the supports, shields and cores, each core being insulated from its shield by a disk 12. These screws 10 may each serve as a binding post for a wire 13 constituting a part of a desired circuit, such as is shown in Figure 13, wherein the electromotive force is derived from an antenna.

While the annular cavity 2 of a core of the shell type, should be so wide that the coil or coils 4, 4a carried by the tube 3 will always be spaced from the proximate wall of the cavity, to thereby avoid metallic contact, the coil or coils should be as close as possible to the central part of the core in order to attain maximum magnetization of the core.

Metal shields 6, disposed around the cores, are optional and are desirable only when thorough shielding is required, as for instance when several instruments 5 are employed in a multi-stage cascade amplifier.

The coils 4, 4a are, preferably, "low-loss" coils of the single-layer solenoidal type, a low-loss coil, according to the United States Bureau of Standards (Circular No. 298, lines 17 et seq., pages 652, 653), being one of low radio-frequency resistance with relatively high self-inductance.

Leads 48, 49 from the coil 4, are provided to permit connecting the coil into an external circuit. In Fig. 3, similar leads 50, 51 are provided for making connections to the primary coil 4a. Similarly, a lead 52 may be provided from a tap at or near the center of the coil 4, for use in circuit arrangements later to be described in which such a tap is required.

If the diameter of a coil is 1 inch, and its length is 1.5 inches, the corresponding core constructed as described, when fully inserted in the coil, produces an effective permeability of substantially 7.5, that is, the ratio of the inductance of said coil with its core fully inserted, to its air core inductance, is substantially 7.5. When the coil is shielded, the said ratio increases to substantially 8.5. This change due to shielding, results from the fact that while an isolated shielded coil loses up to 20% of its inductance because of the short-circuiting effect of the shield, when an iron core is interposed between a coil and a shield, the inductance decrease due to the shield will be less, for example, only about 10% of the total inductance.

Each coil should comprise either a solid insulated wire or a stranded wire consisting of a plurality of insulated wires constituting a cable. These coils are preferably closely wound if of stranded wire, a close winding being inductively more efficient than a spaced winding, although, if a solid insulated wire is employed, undue radio-frequency resistance may be prevented by adequate separation of the turns.

In order to produce the above stated effective permeability of 7.5 by a given core, the coil used with the core should have a ratio of length to diameter of substantially 1.5 to 1. If greater permeability is required, the core may be lengthened, to correspond with a coil of increased ratio of length to diameter, for example, 2 to 1, in which case the coil being longer, will have less inductance relative to resistance. On the other hand, if magnetic material having greater permeability is used for the core, the length of the coil relative to its diameter may be reduced.

The standards 9 each has a horizontal portion 9a, and the base 8 carries guides 14, secured to the base 8 by bolts 14a and having grooves 15 which receive the side edges of the horizontal portions 9a. A rack bar 16 engaging a pinion 17, is adjustably secured to all of the standards 9, so that the standards, and consequently the movable parts of the instruments 5, may be longitudinally adjusted relatively to the base 8, bolts, such as 16a, being employed to hold the standards 9 and the rack bar 16 in their adjusted positions with respect to each other. The pinion 17 is mounted on an actuating shaft 18.

Secured to the base 8 is a fixed index finger 19 that extends upward in proximity to an oscillatory graduated scale 20 indicating radio frequencies, the scale having a vertical slot 20a into which extends a pin 20b carried by one of the standards 9.

Standards 21 fixed to and rising from the base 8 are suitably secured to the closed ends of the shields 7 by screws 22, and to the base 8 by bolts 22a.

Figures 4 and 5 show a core 1, an inductance coil 4, shields 6, 7, a screw 10, an insulating sleeve 11 and an insulating disk 12, all similar to those shown in Figure 1, but this form of the device includes four instruments 5 and the several elements are vertically instead of horizontally disposed.

The cores 1 and the parts 6 of the shields are pendently sustained by a horizontal plate 23 having a vertical guide 24 on its under side that runs in vertical grooves 25 in the vertical sides 26 of a frame 27 mounted on legs 27a, to the lower end 28 of which frame 27, the parts 7 of the shields and the tubes 3 of its inductance coils 4, are secured.

Secured to the vertical guide 24 at 29, is a flexible cable 30 that extends over pulleys 31, which, at its ends 32, 32, is reversely wound on helically-grooved pulleys 33 carried by a shaft 34 that is mounted in bearings 35 extending from the lower end 28 of the frame 27.

Attached to the cable 30 at 36, is a counterbalance 37 for the movable parts 1, 6 of the instruments 5 and for the plate 23, this counterbalance being carried by a guide 38 which freely encompasses the proximate side 26 of the frame 27, so that it may slide up and down thereon.

The single or plural inductance units 5, such as hereinbefore described, may variously be incorporated in single or multiple radio-frequency circuits, such as shown by Figures 6 to 26 inclusive, wherein it may be required simultaneously to vary the properties of the circuits or to attain so-called synchronism of frequencies. In all of these circuits wherein tuning is effected by adjusting the cores, the optimum values of amplification and selectivity are attained.

As set forth in my said Patent No. 1,982,689, by the term "apparent permeability" ($\mu$), I mean the ratio of the inductance of a coil having a magnetic core of the material involved, which encloses practically all of the magnetic lines through the coil, to the inductance of the same coil with an air core, and by the term "effective permeability" ($\mu_1$ or $\mu_2$), as used in this application, I mean a similar ratio, but without regard to whether the core is closed, or whether or not the core encloses all of the magnetic lines through the coil.

In a single circuit including an inductance device and capacitance, the inductance device may be conveniently used to effectuate inductive tuning of the circuit to resonance, according to the well-known formula $$f = \frac{1}{2\pi\sqrt{LC}}$$

where $f$ is the frequency to which the circuit is tuned. The inductance L may be considered as an initial inductance $L_0$ multiplied by $\mu_1$, $\mu_1$ being the effective permeability when any portion of the core effectively overlaps any portion of the coil. Therefore, the initial or maximum frequency to which the circuit is tuned by the inductance when the core is withdrawn from the coil, is represented by the formula $$f_0 = \frac{1}{2\pi\sqrt{L_0 C}}$$

any other frequency by $$f_1 = \frac{1}{2\pi\sqrt{L_0 \mu_1 C}}$$

and the lowest frequency by $$f_2 = \frac{1}{2\pi\sqrt{L_0 \mu_2 C}}$$

where $\mu_2$ is the maximum effective permeability which may be, for example, from 7.5 to 8.5. Hence any particular frequency $f_1$ is related to the initial frequency $f_0$ as follows:

$$f_1 = \frac{f_0}{\sqrt{\mu_1}}$$

It is very advantageous to keep the electrical properties of the circuit at certain optimum conditions, which are satisfied when the L/R of that circuit is kept constant at all frequencies to which the circuit may be tuned. The higher the value of L/R, the better are the properties of the circuit. At a frequency $f_0$, where the core is withdrawn, $L_0/R_0$ of the coil alone is responsible for the successful operation of the circuit. A low-loss coil, such as described in this specification, produces sufficiently high $L_0/R_0$ to obtain desirable results. When the core is partly moved in, certain losses are introduced and the inductance is increased to $L_0\mu_1$. The core is so constructed that, for each new value of inductance $L_0\mu_1$, a new value of effective resistance $R_1$ is introduced in such manner that the value of $$\frac{L_0\mu_1}{R_1}$$

at any new frequency $f_1$, is substantially equal to the original value $L_0/R_0$ of the coil at frequency $f_0$. This result may be achieved by employing a core having varying magnetic density along its magnetic path, of the type disclosed in my aforesaid patent.

Figure 6:
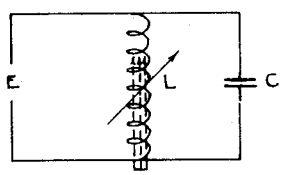

The advantage of maintaining L/R constant will be understood if reference be made to Figure 6, which shows a parallel resonant circuit tuned by an iron core. When such a circuit is tuned to resonance, the circuit is mathematically equivalent to a pure resistance load, which constitutes the so-called dynamic resistance of the circuit ($R_d = L/RC$). Maintaining C constant and L/R of the inductance device constant, causes the dynamic resistance of the circuit to remain constant at any frequency to which the circuit is tuned. Electromotive force E, applied to the circuit, may be produced by a thermionic relay, in which case the amplification produced by such a system is maintained constant.

Figure 7:
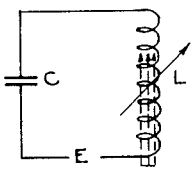

In the case of series resonance, diagrammatically represented by Figure 7, the current is represented by the value of E/R, and the voltage across the coil L is represented by the formula $$V = E \cdot \frac{L}{R} \cdot 2\pi f$$

or, assuming E to be constant, V will vary in proportion to the frequency if L/R is constant. In the specific case of tuning an open antenna, the voltage V appearing across the inductance L may be applied to succeeding radio-frequency amplifiers.

In the circuits of Figures 6 and 7, the selectivity of each circuit is dependent on the decrement of the circuit, and the width of the selectivity curve at the base drawn at $$\frac{1}{n}$$

of maximum amplitude, corresponding to a frequency $f_1$ that is off resonant frequency $f_0$ (expressed in kilocycles), is $$f_0 - f_1 = K\frac{R}{L}$$

where K is a constant depending on $n$ and the units employed. Therefore, maintaining either L/R or R/L constant will result in constant selectivity or band width in kilocycles throughout the range of frequencies to which the circuit may be tuned.

Figure 8:
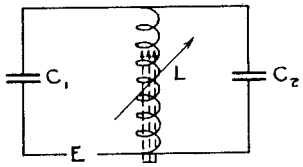

It is often possible to combine properties of parallel resonance (Figure 6) with those of series resonance (Figure 7), in which case a suitable circuit is shown by Figure 8, where an electromotive force E is serially applied in the circuit, part of which, composed of L and $C_2$, is a parallel resonant circuit. The properties of both branches of the circuit are changed by changes of inductance L, so that L/R is kept constant.

In Circular No. 74 of the Bureau of Standards of the United States Department of Commerce, page 46, lines 5 to 14 inclusive, the properties of such a circuit are described as follows:

It is easily seen, therefore, that such a circuit is very useful where it is desired to have current of a certain frequency in a circuit but to exclude current of a certain other frequency. For example, if it is desired to receive radio messages of a certain wave length from a distant station, and a nearby station operating on a different wave length emits waves so powerful as to interfere with the the reception, the interfering signals can be greatly reduced by using this kind of circuit. The circuit $C_2L$ is first independently tuned to resonance with the waves which it is desired to suppress.

Thus, it is possible by the use of tuned inductance L to suppress undesirable interfering signals and thereby additionally increase the selectivity.

Figure 9:
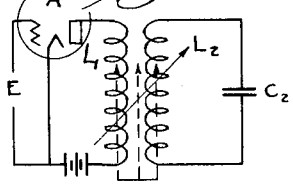

Figure 9 shows a variation of a parallel resonant circuit, wherein the source of electromotive force, which may include a thermionic relay, is electrically separated from the tuned circuit $L_2C_2$, but is inductively coupled therewith by a transformer of 1:1 ratio. Inductances $L_1$ and $L_2$ are made equal and are closely wound on a tube and similarly affected by a common core.

In order to obtain optimum results as regards both amplification and selectivity, the circuits tuned by an iron core should directly load the input as shown in Figure 6, or equivalently in Figure 9.

Figure 10:
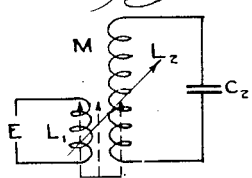

The dynamic resistance of the circuit is best determined by choosing such values of $L_0$ and C that L/RC is adapted to match the source impedance, which may be the plate resistance of a thermionic relay, the selectivity being a function of R/L. However, in some cases it is preferable to obtain still greater selectivity, with consequent lower dynamic resistance, by employing coupling means between the source of applied electromotive force and the load of the circuit. It may be desirable to weaken the coupling in the required degree, and in this way obtain necessary selectivity. Figure 10 shows such a circuit wherein an electromotive force E is applied to the primary $L_1$ of the transformer, and where secondary $L_2$ and the capacitance $C_2$ constitute a tuned circuit, $L_2$ being varied by moving the iron core so that $L_1$ and the mutual inductance M will simultaneously be varied and the coupling will remain substantially uniform. The preferred form of windings for this circuit is shown in Figure 3.

Figure 11:
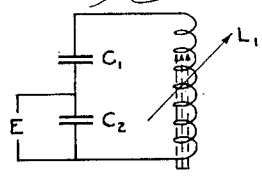

Another convenient way of coupling the circuit to the source of electromotive force, is shown by Figure 11, where a fixed coupling is obtained by so arranging capacitance $C_2$ that it is common to both the input and the resonant circuits.

Figure 12:
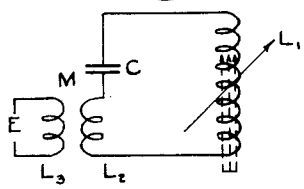

Figure 12 represents a stationary coupling means composed of inductances $L_2$, $L_3$ and mutual inductance M, all three of which are constant and outside of the influence of a magnetic core. As the inductance of $L_1$ is increased by movement of its core, the coupling is automatically weakened.

Another way of obtaining a variable coupling of capacitive nature, is shown in Figure 13, wherein the high-potential side of the source of input voltage E is connected to the iron core by a wire 13. When the core is moved into the coil, there exists a certain capacitance between the core and the winding of L, which increases as the core is moved further into the coil, which movement at the same time, corresponds to a decrease of frequency. If an open antenna be used, this form of coupling is of especial advantage as a means for tuning the circuit which is associated with the antenna.

Figure 14:
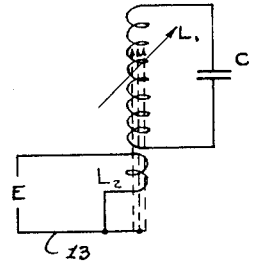

Figure 14 shows a variable coupling, similar to that of Figure 13, employing in addition variable inductive coupling produced by a coil $L_2$. This coil $L_2$ may be wound on the core and move with it, or it may be in fixed relation to the inductance $L_1$.

Figure 15:
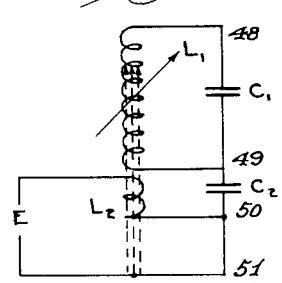

Figure 15 shows a preferred form of the type of coupling shown in Figure 14 wherein the flow of current in the coil $L_2$ is controlled by an additional capacitance $C_2$, in order to produce uniform gain of the circuit $L_1$, $C_1$.

Figure 16:
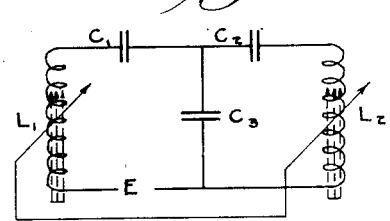
Figure 17:
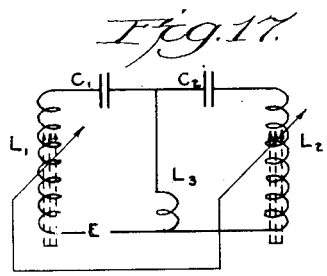

To obtain greater selectivity, two circuits, each tuned by an iron core and loosely coupled by a capacitance $C_3$ as shown in Figure 16 or by an inductance $L_3$ as shown in Figure 17, may be employed. The arrows indicate that both circuits of Figures 16 and 17 may be simultaneously tuned.

Figure 17A:
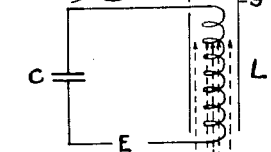

The previously stated advantages secured by a shielding of the coil in combination with a movable core, so as to increase total inductance variation, are schematically represented by Figure 17a wherein a coil L is enclosed in the shield S which may be applied to any of the circuits of the present invention.

Figure 18:
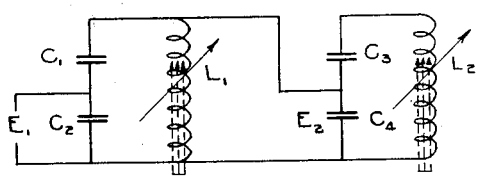

Similarly, loose coupling of several circuits may be obtained by cascading them, the coupling being obtained through capacitance $C_4$ which is common to two tuned circuits, as shown in Figure 18.

Figure 19:
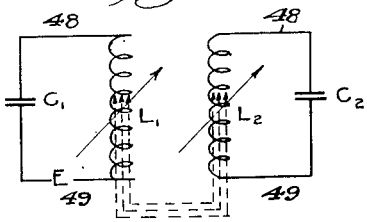

Figure 19 represents two separate insulated circuits $L_1$, $C_1$ and $L_2$, $C_2$ between which variable capacitive coupling is obtained by connecting the cores together with a non-magnetic conductor. By making the connector of magnetic material, variable inductive coupling may be obtained.

Figure 20:
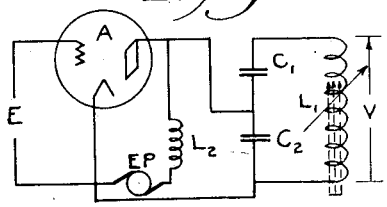

Figure 20 shows a radio-frequency amplifier including a thermionic relay A, coupled to the tuned circuit $L_1$, $C_1$, $C_2$ by means of capacitive coupling secured by so arranging capacitance $C_2$ that it is common to the plate circuit of thermionic relay A and the tuned circuit $L_1$, $C_1$, $C_2$.

Figure 21:
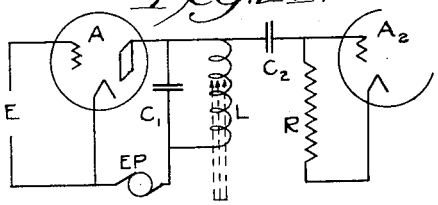

Figure 21 shows an amplifier wherein a tuned circuit L, $C_1$ is connected directly to the plate of the thermionic relay A, the coupling to the succeeding thermionic relay $A_2$ being accomplished through a capacitance $C_2$, resistance R being employed because it is essential for the grid bias of thermionic relay $A_2$. This resistance R, at high frequencies, when the resistance of the inductance L is extremely small, introduces additional losses resulting in a drop of amplification and in a broadening of the selectivity of the circuit $C_1$, L.

Figure 22:
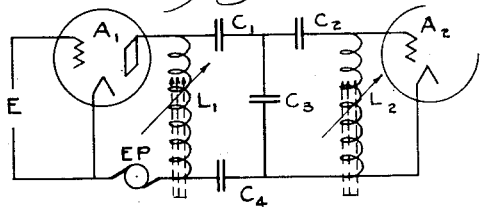

Figure 22 is another variation of an interstage coupling comprising two circuits $L_1$, $C_1$, $C_3$, $C_4$ and $L_2$, $C_2$, $C_3$, the first of which is in the plate circuit of thermionic relay $A_1$ and the second is in the grid circuit of thermionic relay $A_2$. The capacitance $C_3$ is common to both circuits, and regulates the degree of coupling between the two circuits. Capacitance $C_4$ is necessary to insulate the plate supply from the other parts of the circuit.

Figure 23:
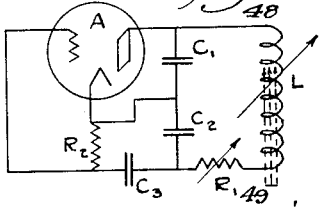

Figures 23, 24, 25, and 26 show the application of iron-core-tuned inductances to various types of frequency-generating apparatus known in the art as thermionic relay oscillators. Figure 23 shows an oscillator including a thermionic relay A, its grid and plate being connected to the opposite ends of coil L, the inductance of which is varied by an iron core to produce oscillations of various frequencies. Capacitances $C_1$ and $C_2$, being preferably of equal values, serve as voltage-dividing means with respect to the cathode of the thermionic relay A. Regulating resistance $R_1$ may be employed to control the current in the circuit L, $C_1$, $C_2$, so as to equalize the current output at different frequencies.

Figure 24:
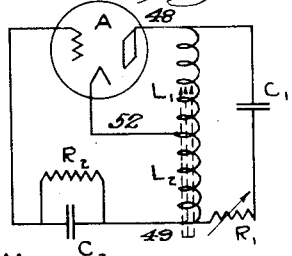

Figure 24 represents apparatus wherein a center tap of the inductance $L_1$, $L_2$ is provided for the cathode of thermionic relay A. A variation of Figure 24 is represented in Figure 25 where the plate inductance $L_1$ only is tuned to generate the desired frequencies, the inductance $L_2$ not being included in the tuned plate circuit.

Figure 26 represents another form of oscillator, wherein a circuit $L_1$, $C_1$, $R_1$ is tuned by an iron-core inductance $L_1$, the circuit operating on the principle known as a dynatron oscillator.

Figure 25:
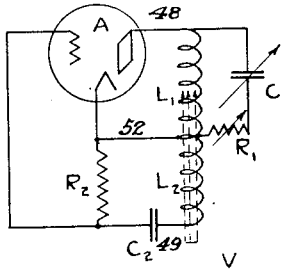

Figures 24 and 25 show a tapped inductance coil, parts of which are respectively in the grid and plate circuits of the thermionic relay A. The tap may be placed in such a position that one part of the coil will be more affected than the other by the core movement, thus producing variable excitation of the oscillator to equalize the output current at different frequencies.

Figure 27 graphically represents operating conditions of the described oscillators. Curve $a$ shows the variation of current output of the oscillator of Figure 23 when $R_1$ is short-circuited, and curve $b$ shows the variations of current of the same oscillator when $R_1$ is included in the circuit so as to obtain substantially uniform output of current at different frequencies. Curves $c$, $d$ and $e$ correspondingly show variations of current with frequency in the oscillators of Figure 24, Figure 25 and Figure 26 with $R_1$ in the circuit, and curve $f$, read from the scale on the right of Figure 27, shows the output voltage obtainable from the coil $L_1$ of Figure 26 when the oscillator is operating at different frequencies.

Wherever, in the drawings, the symbol E is shown, it indicates the point at which electromotive force is applied to the circuit. It is to be understood that this electromotive force may arise in an antenna system, such as shown in Figures 7, 8, 10, 13, 14, and 17a, in which case the lines terminating at the symbol E would be the connections to the aerial and ground respectively, or said electromotive force may arise in any other input of electrical energy such as the output of a thermionic relay.

Having thus described my invention, what I claim is:

1. A variable inductance device consisting of a coil and means for varying the effective inductance of the coil, characterized in that said means comprises a compressed comminuted magnetic core movable relatively to said coil and having varying magnetic density in the direction of said relative motion, whereby said device has a ratio of effective inductance to high-frequency resistance substantially expressed by the formula $$\frac{L_0}{R_0} = \frac{\mu_1 L_0}{R_1}$$

in which $L_0$ is the minimum inductance of said device, $R_0$ is the high-frequency resistance of the device measured at a first operative frequency, $f_0$, of said device, $\mu_1 L_0$ is the increased inductance of the device for any operative position of said core when moved towards said coil, and $R_1$ is the high-frequency resistance of the device for the said moved position of said core and measured at a second operative frequency, $f_1$, of said device, the relation between said frequencies being $$f_1 = \frac{f_0}{\sqrt{\mu_1}}$$

2. A radio-frequency variable inductance device including a coil, a compressed comminuted magnetic core and means for producing relative motion between the core and the coil, said core having varying magnetic density in the direction of said relative motion, whereby said device has a ratio of inductance to radio-frequency resistance substantially expressed by the formula $$\frac{L_0}{R_0} = \frac{\mu_1 L_0}{R_1}$$

where $L_0$ is the minimum inductance of the device, $R_0$ is the radio-frequency resistance of the device measured at the highest operative frequency, $f_0$, of said device, $\mu_1$ is the effective permeability at any lower operative frequency $f_1$, $R_1$ is the radio-frequency resistance of said device at said lower frequency, and $$f_1 = \frac{f_0}{\sqrt{\mu_1}}$$

3. A variable inductance device including an inductance coil and a relatively movable compressed comminuted magnetic core having varying magnetic density along its magnetic path, whereby throughout at least one range of high frequencies which said device is adapted to cover, the ratio between inductance and resistance will be maintained substantially constant.

4. A variable inductance device including an inductance coil of a certain L/R value at a given frequency, a relatively movable compressed comminuted magnetic core having varying magnetic density along its magnetic path and disposed in the field of said inductance coil, said core producing substantially the same L/R value at any other frequency at which said device is adapted to operate.

5. A variable inductance device including an inductance coil whose ratio of length to diameter is approximately 1.5 to 1, and a compressed comminuted magnetic core having varying magnetic density along its magnetic path and being relatively movable in the field of said coil.

6. A variable inductance device including an inductance coil and a compressed comminuted magnetic core of a substantially closed magnetic type, one of which is movable relatively to the other, said device having a given range of inductance variation, and a conductive shield surrounding said inductance coil for increasing said range of variation.

7. A variable inductance device including an inductance coil and a compressed comminuted magnetic core which are movable one relatively to the other, a conductive shield surrounding said inductance coil, and a second shield telescoping with said conductive shield when said magnetic core is moved in the field of said inductance coil.

8. A radio-frequency variable inductance device including an inductance coil, a compressed comminuted magnetic core having varying magnetic density along its magnetic path and adapted to receive said coil, means for varying the effective permeability of the space surrounding the coil by relative movement between said coil and said core, and a metallic shield surrounding said coil which increases the range of variation of inductance, said device having its ratio of inductance to radio-frequency resistance substantially expressed by the formula $$\frac{L_0}{R_0} = \frac{\mu_1 L_0}{R_1}$$

where $L_0$ is the minimum inductance of the device, $R_0$ is the radio-frequency resistance measured at the highest operative frequency, $f_0$, of said device, $\mu_1$ is the effective permeability at any lower operative frequency $f_1$, $R_1$ is the radio-frequency resistance of said device at said lower frequency, and $$f_1 = \frac{f_0}{\sqrt{\mu_1}}$$

9. A variable inductance device including an inductance coil, a relatively movable compressed comminuted magnetic core having varying magnetic density along its magnetic path, whereby throughout at least one range of high frequencies which said device is adapted to cover, the ratio between inductance and resistance may be maintained substantially constant, and another coil inductively related to said inductance coil, the mutual inductance between said coils being altered when the inductance of said device is varied.

10. A variable inductance device including an inductance coil which is one of the primary and secondary coils of a transformer, and a compressed comminuted magnetic core having varying magnetic density along its magnetic path and movable in the field of said inductance coil to produce a change in the effective inductance of said inductance coil and in the mutual inductance between the primary and secondary coils of said transformer.

11. A multiple variable inductance device including a plurality of inductance coils, compressed magnetic cores synchronously movable relatively to said coils and each disposed in the field of its coil for producing an inductance variation thereof, means for producing said relative motions in unison, and means for independent axial adjustment of the relative positions of at least one core and coil, said inductance variation being caused solely by the relative motion of said cores with respect to said coils.

12. A multiple variable inductance device including a plurality of inductance coils, an external shield surrounding each of said coils, and a plurality of compressed magnetic cores, one of said pluralities being mounted on a stationary portion of said device, and the other plurality being mounted on a movable portion of said device, said movable portion having a sliding member guided by an engaging member of the stationary portion, and an indicator of said movement actuated by said movable portion, the inductance variation of said device being caused solely by the relative motion of said cores with respect to said coils and shields.

13. A variable inductance device including at least one winding of a transformer, and a relatively movable compressed comminuted magnetic core having varying magnetic density along its magnetic path, whereby throughout at least one range of frequencies which said device is adapted to cover, the ratio between the effective inductance and the effective resistance of said winding is maintained substantially constant.

14. A variable inductance device including an inductance coil, a compressed comminuted magnetic core insulated from said coil, means for producing relative motion between said coil and said core, a circuit associated with said device, and means for producing variable capacitance coupling between said coil and said circuit, said latter means including an electrical connection to said core whereby said coil and said core constitute the electrodes of a variable capacitance.

15. A multiple variable inductance device including a plurality of single-layer low-loss inductance coils, a plurality of compressed comminuted magnetic cores, each of said cores being of a substantially closed magnetic type and having an annular cavity to receive one of said coils, means for producing relative movements in unison between said plurality of coils and said plurality of cores, a conductive shield surrounding each of said coils, and means for independent adjustment of the relative position of at least one of said coils with respect to its core.

16. A variable high-frequency inductance device including an inductance coil and a relatively movable comminuted magnetic core, the density of the magnetic content of said core and the losses in said core varying per unit volume along the path of the magnetic circuit of said core and said coil in such manner that said density and said losses are lower at that portion of said core which first enters said coil than are said density and said losses at other portions of said core.

17. A variable high-frequency inductance device including an inductance coil and a relatively movable comminuted magnetic core the magnetic content of which is so distributed along its magnetic axis as to maintain the ratio between the effective inductance and the effective resistance of said device substantially constant throughout the range of variability thereof.

18. A variable high-frequency inductance device including an inductance coil, a compressed comminuted magnetic core insulated from said coil, means for producing relative motion between said coil and said core, a circuit associated with said device, and means for producing variable capacitive and variable inductive coupling between said coil and said circuit, said means including an electrical connection to said core and a winding in said circuit.

WLADIMIR J. POLYDOROFF.

CERTIFICATE OF CORRECTION.

Patent No. 2,113,603.                      April 12, 1938.

WLADIMIR J. POLYDOROFF.

It is hereby certified that error appears in the printed specification of the above numbered patent requiring correction as follows: Page 3, second column, the paragraph beginning in line 37 and ending in line 49, should be set off by quotation marks; line 45, for "the the" read the; and that the said Letters Patent should be read with these corrections therein that the same may conform to the record of the case in the Patent Office.

Signed and sealed this 24th day of May, A. D. 1938.

(Seal)                                                Henry Van Arsdale,
                                                         Acting Commissioner of Patents.